United States Patent [19]
Richey et al.

[11] Patent Number: 5,193,138
[45] Date of Patent: Mar. 9, 1993

[54] OFF-PEAK THERMAL STORAGE SYSTEM PROVIDING A PLURALITY OF SELECTED TEMPERATURE OUTLETS

[76] Inventors: Steven M. Richey, 6960 W. Andrew Johnson Hwy., Talbot, Tenn. 37877; Richard E. MacDonald, 3117 Providence Cir., Morristown, Tenn. 37814-2584; Jimmy F. Mathis, 512 Windridge La., Morristown, Tenn. 37814

[21] Appl. No.: 686,748

[22] Filed: Apr. 16, 1991

[51] Int. Cl.⁵ .................. H05B 1/02; G05D 23/13; F24H 7/04
[52] U.S. Cl. .................. 392/341; 237/19; 165/104.19
[58] Field of Search ........ 392/341, 462, 464; 126/361; 237/19; 165/104.19, 104.28

[56] References Cited

U.S. PATENT DOCUMENTS

| | | | |
|---|---|---|---|
| 1,680,014 | 8/1928 | Dak et al. | 392/341 |
| 3,007,470 | 11/1961 | Heeger | 126/362 |
| 3,212,566 | 10/1965 | Karassik et al. | 122/33 |
| 3,422,248 | 1/1969 | Beaulieu et al. | |
| 4,243,871 | 1/1981 | McKenney | 392/341 |
| 4,257,556 | 3/1981 | Skala | 392/341 |
| 4,347,972 | 9/1982 | Hillerstrom et al. | 237/19 |
| 4,445,023 | 4/1984 | McKenney | 165/34 |
| 5,115,491 | 5/1992 | Perlman et al. | 392/454 |

FOREIGN PATENT DOCUMENTS

| | | | |
|---|---|---|---|
| 1114296 | 9/1961 | Fed. Rep. of Germany | 237/19 |
| 3238285 | 4/1984 | Fed. Rep. of Germany | 237/19 |
| 1358166 | 6/1974 | United Kingdom | 392/341 |
| 1412482 | 11/1975 | United Kingdom | 392/341 |
| 8204370 | 12/1982 | World Int. Prop. O. | 392/341 |

*Primary Examiner*—Bruce A. Reynolds
*Assistant Examiner*—John A. Jeffery
*Attorney, Agent, or Firm*—Pitts & Brittian

[57] ABSTRACT

A thermal storage system (10) provides a means for storing thermal energy acquired from electricity purchased at off-peak demand times and from other fuel sources such as fossil fuels, waste heat, and solar energy. The thermal storage system (10) is also designed to supply a plurality of system outputs (124) at individually selected temperatures. The thermal storage system (10) includes a storage tank (12) for storing and heating fluids. Insulation (44) is provided to prevent energy from being transferred to the environment surrounding the storage tank (12). An external housing (46) is provided to protect the insulation (44) and to further insulate the storage tank (12). Heating elements (76) are included for the heating of the stored fluid. A fluid circulator (22) is provided for circulating the fluid to obtain a substantially constant temperature throughout the storage tank (12). An exchange assembly (24) is provided for drawing high temperature fluid from the storage tank (12), mixing the high temperature fluid with lower temperature fluid to obtain at least one selected temperature system water, and dispensing the desired temperature water to the appropriate systems. A control cabinet (26) is carried by the external housing (46) for housing the electrical components of the thermal storage system (10).

10 Claims, 7 Drawing Sheets

OFF-PEAK THERMAL STORAGE SYSTEM PROVIDING A PLURALITY OF SELECTED TEMPERATURE OUTLETS

DESCRIPTION

1. Technical Field

This invention relates to the heating and storage of fluid. More specifically, this invention relates to an apparatus for the efficient heating and storage of fluid to be used in commercial and residential structures for the provision of heated air and water.

2. Background Art

It is well known in the field of thermal storage that substantial savings may be realized from the heating and storage of a thermal storage medium at off-peak energy demands. It is also well known that the cost of electricity purchased to heat the thermal storage medium can fluctuate as the demand rate fluctuates. Typically, a threshold level of consumption within a given period is defined at which the cost of electricity sharply increases. When fuels other than electricity, such as fossil fuels and solar energy, are used to heat fluids, thus peak demand prices are not a factor, it is known that maximum efficiency is attained when the heaters are operated at a constant rate. The required design capacity of the storage unit in such a thermal storage system will be seen to be lower than the level required to meet peak demand if operated on an as-needed basis. It can be seen then, that for any given fuel source, thermal storage can serve to reduce the cost and efficiency of providing heated water and air to a commercial or residential structure.

It is well known to those skilled in the art of thermal storage that a pressurized storage vessel allows for the storage of fluid in excess of the flash point temperature. The flash point of water under atmospheric pressure (0 pounds per square inch gauge, or p.s.i.g.) is 212° F. It is also well known that the temperature within the vessel is directly proportional to the pressure. It is known in the art that water pressurized at 70 p.s.i.g. has a flash point in excess of 290° F. when properly charged and yields a thermal storage capacity approximately twice that of water at atmospheric pressure.

Several devices using pressurized tanks and heat exchangers have been produced to provide means for heating water and air with electricity purchased at off-peak demand times. Typical of the art is the device disclosed in U.S. Pat. No. 3,422,248 issued to A. A. Beaulieu, et al., on Jan. 14, 1969. The Beaulieu patent discloses a hydronic-electric heating system used for transferring stored heat to a domestic water supply and to an air heating system. Two separate systems are included to serve these purposes, the air heating system being closed. The Beaulieu device employs a storage tank for holding a volume of water to be heated during off-peak demand time while electricity costs are lower, the stored heat then being transferred to the separate domestic water supply and heating systems. In the domestic water heating system, a pair of coils are immersed within the storage tank and are used separately and in combination to heat a supply of system water to a selected level, the heating being accomplished by heat transfer through the coil surfaces. Similarly, in the air heating system, a single coil is immersed in the tank of heated water and a separate supply of water is heated by heat transfer through the coil surface, the heat transferred to the heating system then being transferred to an air supply at a selected temperature.

However, the above described device and other similar devices require the use of separate heating systems for each desired use. A thermal storage unit used to heat domestic water and space requires a system specifically to output water at a desired temperature, typically 140° F., and an independent system for the output of water at a second desired temperature to heat air for a space heating system. Typically, the devices are designed to maintain a temperature within the storage tank limited to approximately 280° F. These devices transfer heat to system water (water used as potable water or used in a heating system) through the immersed heat exchangers, the volume within the storage tank being independent from and not in fluid communication with the volumes within the heat exchangers.

Therefore, it is an object of this invention to provide a thermal storage system including a thermal storage means from which heated fluid may, through exchange, be used as domestic water and as a heat transfer medium for space heating.

It is also an object of the present invention is to provide a means for delivering heated water at a selected temperature for the prescribed applications.

Another object of the present invention is to provide a storage outlet for supplying a plurality of system outputs with heated water, each of the system outputs individually mixing the heated water with cold water to deliver heated water at a selected temperature for a selected purpose.

Still another purpose of the present invention is to provide an efficient means for heating the fluid within the storage tank.

DISCLOSURE OF THE INVENTION

Other objects and advantages will be accomplished by the present invention which serves to store thermal energy acquired from electricity and from other fuels such as fossil fuels, waste heat, and solar energy. The thermal storage system utilizing electricity is designed to operate at off-peak demand times such as to create a substantially constant total electricity demand from the structure, the total demand including electricity required to operate lights, appliances, and any other electrically operated devices. The thermal storage system utilizing fuels such as fossil fuels and solar energy is designed to operate at a constant rate to maximize efficiency, the required storage capacity thus being lower than that required to supply heated water during peak demand periods when the water is being heated as required or when heated by electricity and stored.

The thermal storage system of the present invention includes a fluid storage tank for storing and heating water. The storage tank of the preferred embodiment is pressurized to allow for the heating of water at temperatures in excess of 212° F., and up to 600° F., such that greater thermal storage capacity may be obtained. The storage tank may be oriented vertically or horizontally, depending upon constraints such as required volume and available floor space. An insulating means is provided to prevent energy from being transferred to the environment surrounding the storage tank. An external housing is provided to protect the insulation. The external housing also serves to further insulate the storage tank. A storage tank support means is provided to prevent movement of the storage tank with respect to the supporting surface. The storage tank support means includes a plurality of supports attached to the storage tank and the inside of the external housing such that the position of the external housing is fixed with respect to the storage tank. A plurality of ports are defined by the storage tank for the introduction and evacuation of water and for limiting tank pressure. A cold fluid inlet is provided for the introduction of fluid to the storage tank for heating and future use. A hot fluid outlet is provided for delivering heated fluid at a selected temperature for exchange with cold water and distribution for use as potable water or as a heat transfer means for space heating. A warm fluid inlet is provided for the introduction of fluid previously discharged through the hot fluid outlet and not discharged through the exchange assembly. A drain valve is provided for selectively draining the storage tank for maintenance or as otherwise required. A relief valve is provided proximate the top of the storage tank for limiting the pressure within the storage tank.

A heating means is included for the heating of the stored fluid. The heating means may be powered by electricity or other fuel source as desired. In the preferred embodiment, the heating means includes a plurality of heating elements located proximate the bottom of the volume such that the fluid at the lowest temperatures will be contacted and heated. The heating means may be carried within the storage tank or about the exterior of the storage tank as required.

In the vertically disposed storage tank, the external housing is substantially box-shaped. A fluid circulating means is carried within the storage tank of this embodiment for circulating the fluid to obtain a substantially constant temperature throughout the storage tank. The fluid circulating means of the preferred embodiment has a substantially inverted funnel configuration and is carried by the storage tank wall above the heating means. The fluid circulating means is designed such that as fluid is heated by the heating elements at a location below the fluid circulating means, convection acts to force the fluid toward the top of the storage tank through the top opening. A vacuum is thus created in the bottom portion of the storage tank and the pressure differential then acts to pull fluid from the top portion of the storage tank through the annular opening about the perimeter of the storage tank and into the lower chamber. The fluid pulled to the bottom is then heated and forced to the top portion of the storage tank through the top opening. In the horizontally disposed storage tank, the external housing has a substantially cylindrical configuration. In this embodiment, an outlet pipe is provided for withdrawing heated fluid from the storage tank. The outlet pipe is carried within the storage tank and extends toward the second end of the storage tank a substantial distance such that circulation of the fluid is increased. A substantial 90° downward bend is defined by the outlet pipe proximate the second end such that fluid is drawn from the volume at such a depth as to prevent the drawing of air and cavitation.

An exchange assembly is provided for drawing high temperature fluid from the storage tank, mixing the high temperature fluid, through exchange, with lower temperature fluid to obtain at least one selected temperature system water, and dispensing the desired temperature water to the appropriate systems. A hot fluid outlet provides fluid exchange between the storage tank and the exchange assembly. A high temperature fluid line delivers high temperature fluid to a control valve which is controlled by a temperature sensor. The control valve controls the rate of flow from the high temperature fluid line and a low temperature fluid line, thus balancing the amount of energy output. The temperature sensor includes a temperature control for maintaining a constant temperature fluid to a heat exchanger. The temperature sensor further includes a secondary high limit thermostat for controlling the temperature of the output fluid in the event the control valve fails and delivers fluid at a temperature in excess of 35° F. to 50° F. of the design temperature. When the control valve delivers fluid at a temperature in excess of 35° F. to 50° F. of the design temperature, the secondary high limit thermostat turns the control valve OFF such that no high temperature fluid is allowed into the mixing system. A heat exchanger is provided to reduce the system fluid temperature to the final design temperature. A thermostatic control valve is carried by the heat exchanger for setting the design temperature as desired. A cold water inlet is carried by the heat exchanger for exchange with the fluid introduced from the storage tank, the percentages of heated and cold fluids being controlled by the thermostatic control valve. A plurality of heat exchangers may be included in series or in parallel, with the temperature of the heated fluid being introduced to each heat exchanger in parallel, and to each of the first heat exchangers in each series, being that design temperature as delivered through the temperature sensor by the control valve. A system outlet is carried by each of the heat exchangers for delivering heated water at the temperatures selected by the thermostatic control valves to the potable water supply and to the space heating system. A plurality of return lines are provided for recirculating fluid from the heat exchangers to be used in selectively cooling high temperature fluid in the control valve and to be reintroduced and reheated in the storage tank. A plurality of pumps are connected to and in fluid communication with the return lines and the storage tank and are used to increase the circulation of the fluid within the system. Each pump is operative independently of the other. In the preferred embodiment, two pumps are included. One of these pumps typically operates constantly, with the second pump operating only when a high demand is placed upon the system. A swing check valve is connected along the line fluidly connecting the pumps and the storage tank to prevent the convection action of the system from forcing the heated fluid to flow in the reverse direction.

A control cabinet is carried by the external housing for housing the electrical components of the thermal storage system.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
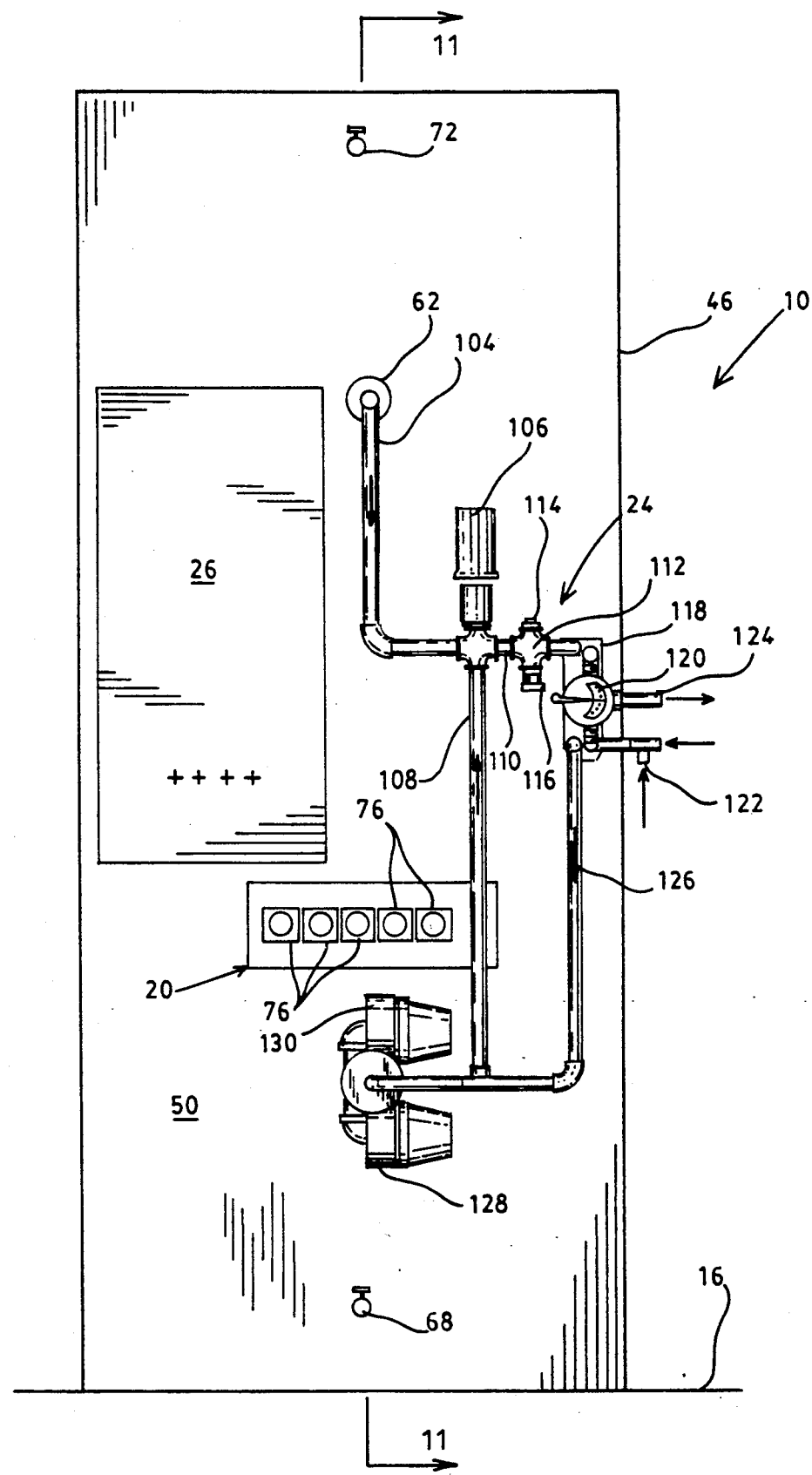
FIG. 1 is a front elevation view of the thermal storage system constructed in accordance with several features of the present invention showing the outlet means for delivering a selected temperature water to a potable water system or space heating system.
Figure 2:
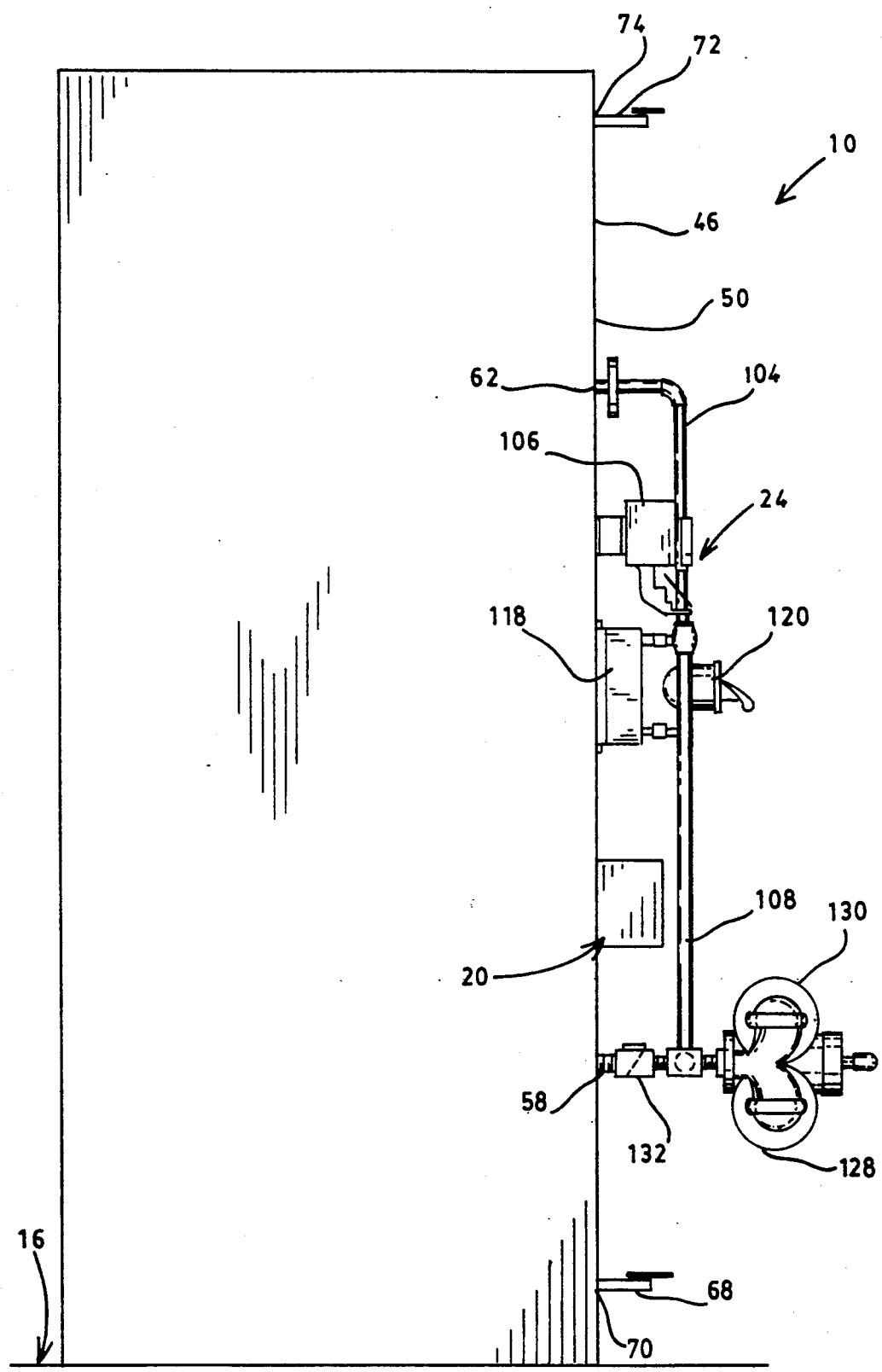
FIG. 2 illustrates a side elevation view of the thermal storage system of FIG. 1.
Figure 4:
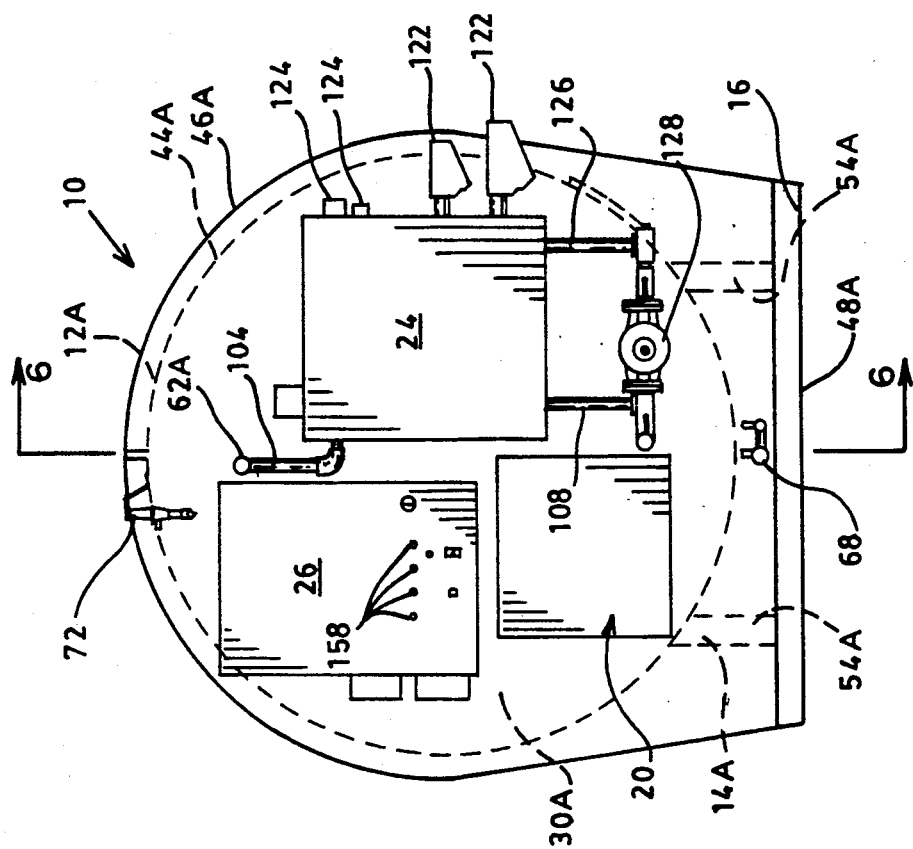
FIG. 4 is a left end elevation view of the thermal storage system showing a horizontally oriented storage tank in phantom.
Figure 3:
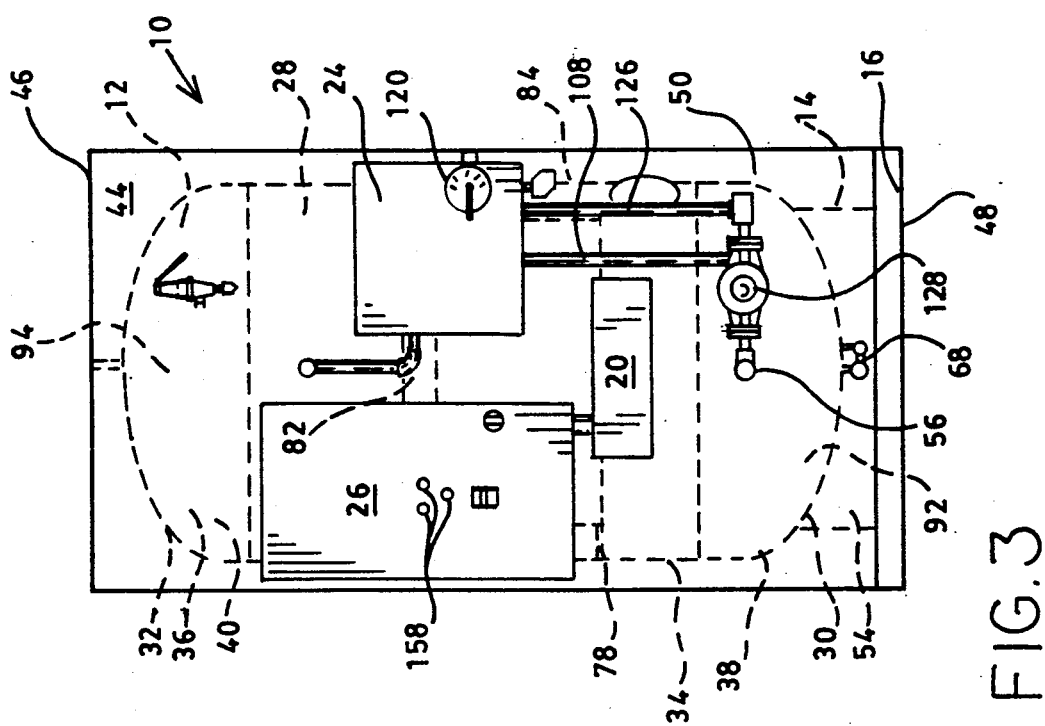
FIG. 3 is a front elevation view of the thermal storage system showing a vertically oriented storage tank in phantom.
Figure 5:
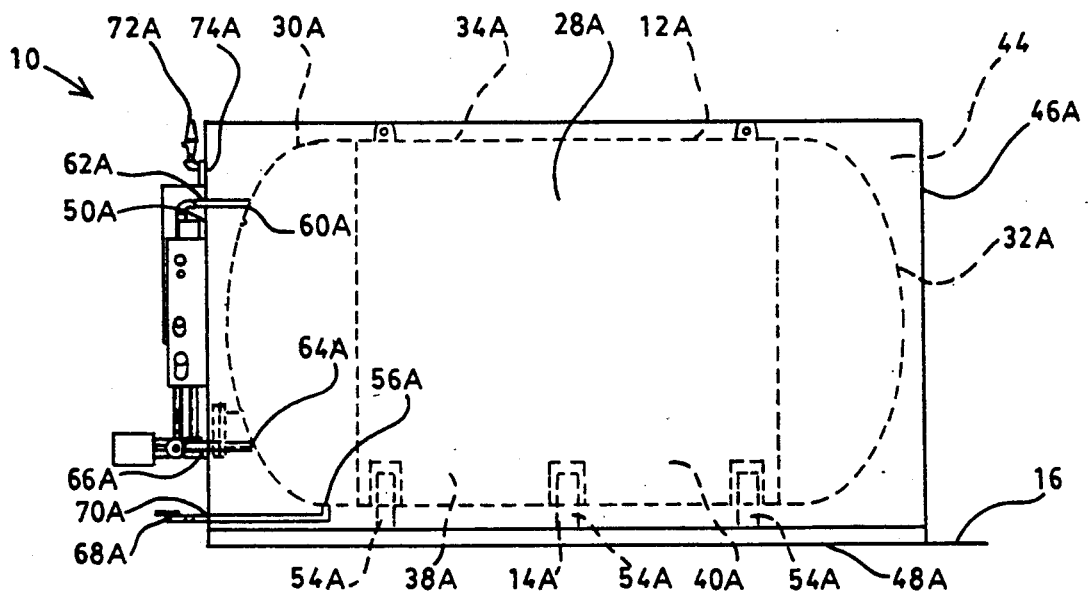
FIG. 5 is a side elevation view of the thermal storage system showing a horizontally oriented storage tank in phantom.
Figure 6:
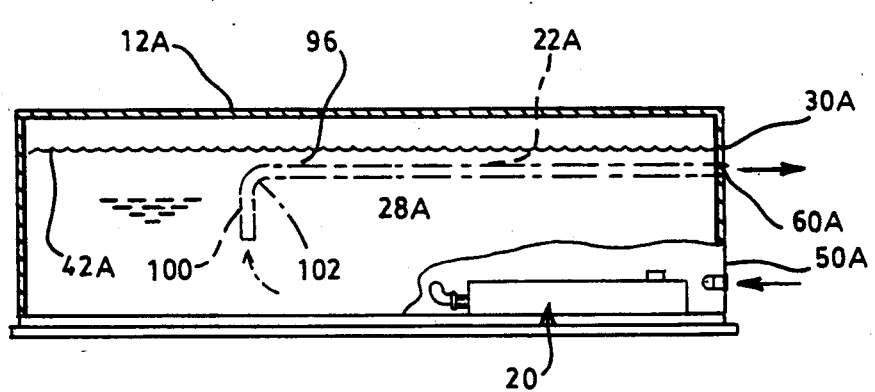
FIG. 6 is a side elevation view of the thermal storage system showing a horizontally oriented storage tank in section along lines 6—6 of FIG. 4.
Figure 8:
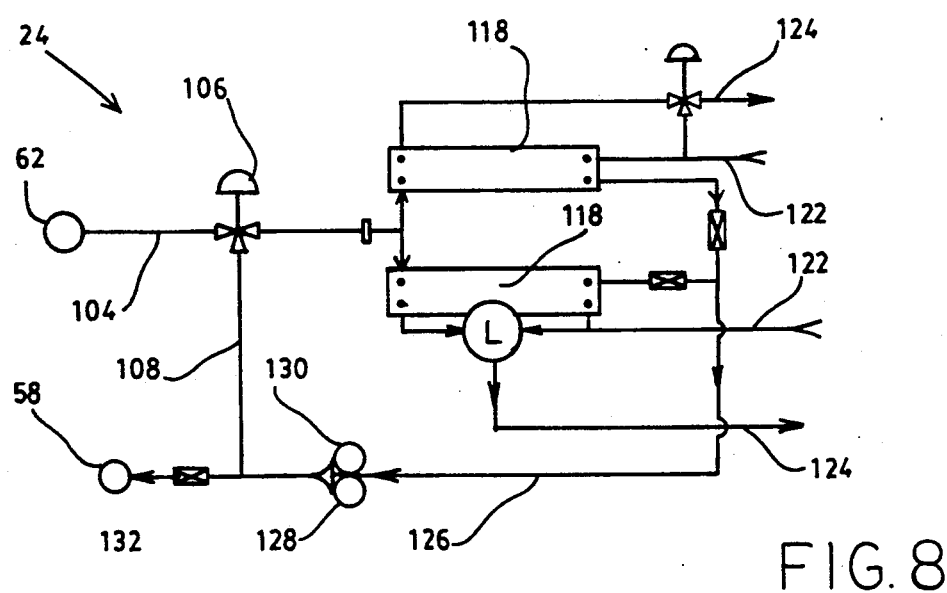
FIG. 8 illustrates a flow diagram of the thermal storage system mixing means showing two heat exchangers for providing water at two selected output temperatures.
Figure 7:
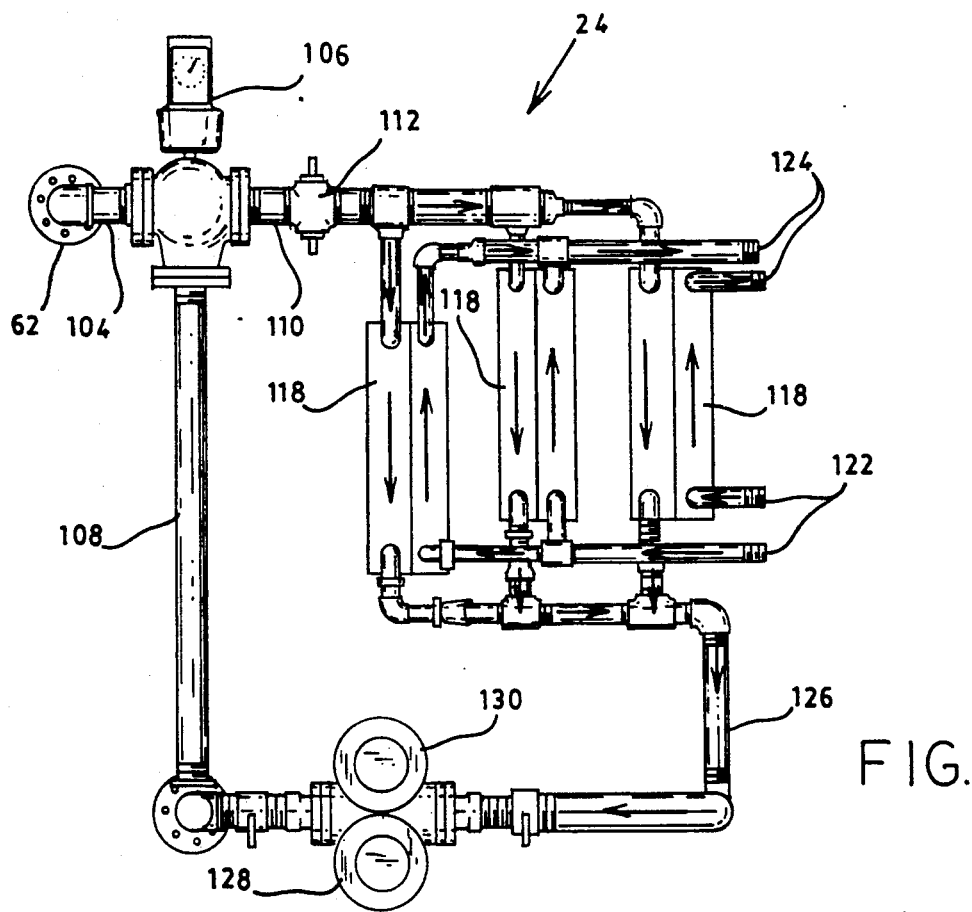
FIG. 7 is a front elevation view of the thermal storage system constructed in accordance with several features of the present invention showing a plurality of heat exchangers connected in parallel for delivering water at a plurality of selected temperatures.

A thermal storage system incorporating various features of the present invention is illustrated generally at 10 in the figures. The thermal storage system 10 is designed for storing thermal energy acquired from electricity and from other fuel sources such as fossil fuels, waste heat, and solar energy. The thermal storage system 10 utilizing electricity is designed to operate at off-peak demand times such as to create a substantially constant total electricity demand from the structure, the total demand including electricity required to operate lights, appliances, and any other electrically operated devices. The thermal storage system 10 utilizing fuel sources such as fossil fuels, waste heat, and solar energy is designed to operate at a constant rate to maximize efficiency, the required storage capacity thus being lower than that required to supply heated water during peak demand periods when the water is heated as demanded or when off-peak electricity is used to heat the stored fluid. Moreover, in the preferred embodiment the thermal storage system 10 is designed to supply a plurality of system outputs 124 through a storage outlet 60, each system output 124 individually mixing the fluid from the storage outlet 60 with cooler fluid to obtain heated system water at selected temperatures.

A fluid storage tank 12 is provided for storing and heating fluid. The storage tank 12 of the preferred embodiment is pressurized to allow for the heating of fluid at temperatures in excess of 212° F. such that greater thermal storage capacity may be obtained. In the preferred embodiment, temperatures of up to 600° F. may be attained. The storage tank 12 defines a selected volume 28 for retaining a volume of heated fluid as required by the particular structure. The storage tank 12 of the preferred embodiment has a substantial cylindrical configuration with closed first and second ends 30-32, the first and second ends 30-32 defining concavities depending from the volume 28. The storage tank 12 of a preferred embodiment is oriented vertically, with the first end 30 being positioned toward a supporting surface 16. In another embodiment, the storage tank, denoted by 12A, with associated numbers being referred to with the suffix A, is oriented horizontally such that a portion of the cylinder 34A is positioned proximate the supporting surface 16. An insulating means 44 is provided to prevent energy from being transferred to the environment surrounding the storage tank 12. The storage tank 12 of the preferred embodiment is provided with a blanket of insulation 44 such as six pound density mineral wool fiber board with a minimum thickness of 4 inches. An external housing 46 is provided to protect the insulation 44. The external housing 46 also serves to further insulate the storage tank 12. The external housing 46 is configured to closely receive and substantially enclose the storage tank 12 and associated insulation 44.

A storage tank support means 14 is provided to prevent movement of the storage tank 12 with respect to the supporting surface 16. In the preferred embodiment, the storage tank support means 14 includes a plurality of supports 54 attached to the storage tank 12 and the inside of the external housing 46 such that the position of the external housing 46 is fixed with respect to the storage tank 12. In this embodiment, a portion of the external housing 46 defines a substantially planar surface 48 for engaging the supporting surface 16.

A plurality of ports 18 are defined by the storage tank 12 for the introduction and evacuation of fluid and for limiting tank pressure. A cold fluid inlet 56 is provided for the introduction of fluid to the storage tank 12 for heating and future use. An opening 58 is defined by the external housing 46 to correspond with the cold fluid inlet 56 such that fluid exchange between the storage tank 12 and a fluid source (not shown) is made possible. In the preferred embodiment, the cold fluid inlet 56 is located proximate the bottom 38 of the storage tank 12, but can be defined along the wall 40 of the storage tank 12 as otherwise required. A hot fluid outlet 60 is provided for delivering heated fluid at a selected temperature for exchange with cold water and distribution for use as potable water or as a heat transfer means for space heating. An opening 62 is defined by the external housing 46 to correspond with the hot fluid outlet 60 such that fluid exchange between the storage tank 12 and the hot water delivery system 24 is made possible. The hot fluid outlet 60 of the preferred embodiment is located along the storage tank wall 40 proximately two-thirds up from the bottom 38 such that the higher temperature fluid may be withdrawn while allowing for the fluid level 42 within the storage tank 12 to fall while remaining above the hot fluid outlet 60, thus without immediately requiring the addition of fluid at lower temperatures. A warm fluid inlet 64 is provided for the introduction of fluid previously discharged through the hot fluid outlet 60 and not discharged through the exchange assembly 24. An opening 66 is defined by the external housing 46 to correspond with the warm fluid inlet 64 such that fluid exchange between the storage tank 12 and the exchange assembly is made possible. A drain valve 68 is provided for selectively draining the storage tank 12 for maintenance or as otherwise required. An opening 70 is defined by the external housing 46 to correspond with the drain valve opening 68 such that fluid transfer between the storage tank 12 and a sewage system (not shown) or other draining facility is made possible. The drain valve 68 is located proximate the bottom 38 of the storage tank 12 such that substantially all of the stored fluid may be selectively withdrawn. A relief valve 72 is provided proximate the top 36 of the storage tank 12 for limiting the pressure within the storage tank 12. An opening 74 is defined by the external housing 46 to correspond with the relief valve 72 such that fluid communication between the storage tank 12 and the surrounding atmosphere is made possible.

A heating means 20 is included for the heating of the stored fluid. The heating means 20 may be carried by the storage tank 12 within or without the volume 28 as required. The heating means 20 may be powered by electricity or other fuel source as desired. In the preferred embodiment, the heating means 20 includes a plurality of heating elements 76 located proximate the bottom 38 of the volume 28 such that the fluid at the lowest temperatures will be contacted and heated.

In the preferred embodiment, the storage tank 12 is disposed vertically such that the first end 30 is situated proximate the support surface 16. The vertically disposed storage tank 12 is preferred when smaller storage volumes are required and in structures where floor space is limited. In this embodiment, the external housing 46 is substantially box-shaped. The inlet and outlet ports 18 of this embodiment are disposed proximate the cylindrical 34 portion of the storage tank 12 and are in fluid communication through corresponding openings defined by one side 50 of the external housing 46. A fluid circulating means 22 is carried within the storage tank 12 of this embodiment for circulating the fluid to obtain a substantially constant temperature throughout the storage tank 12. The fluid circulating means 22 of the preferred embodiment has a substantially inverted funnel configuration and is carried by the storage tank wall 40 above the heating means 20. A bottom opening 80 is defined to be received within the diameter of the storage tank 12 such that an annular ring 84 is defined for the passage of fluid flowing from the top 94 of the storage tank 12. A plurality of mounts 86 are attached at one end 88 to the interior of the storage tank wall 40 and at a second end 90 to the bottom edge 78 of the fluid circulating means 22 such that the fluid circulating means 22 is restrained from movement within the storage tank 12. A top opening 82 is defined by the fluid circulating means 22 for the passage of fluid from the bottom portion 92 of the storage tank 12 to the top portion 94 of the storage tank 12. The opening 82 defined by the top of the fluid circulating means 22 is dimensioned to be substantially smaller than the bottom opening 80. The fluid circulating means 22 is designed such that as fluid is heated by the heating elements 76 at a location below the fluid circulating means 22, convection acts to force the fluid toward the top 94 of the storage tank 12 through the top opening 82. A vacuum is thus created in the bottom portion 92 of the storage tank 12 and the pressure differential then acts to pull fluid from the top portion 94 of the storage tank 12 through the annular opening 84 about the perimeter of the storage tank 12 and into the lower chamber 92. The fluid pulled to the bottom 92 is then heated and forced to the top portion 94 of the storage tank 12 through the top opening 82. It will be seen that the velocity of the fluid will gradually decrease as a substantially constant temperature is attained. When a draw is made from the storage tank 12 and a lower temperature fluid is introduced, the process will resume.

In another embodiment, the storage tank 12A is disposed horizontally. Such a storage tank 12A is preferred when larger volumes of heated fluid are required. In this embodiment, the external housing 46A has a substantially cylindrical configuration. The inlet and outlet ports 18A of this embodiment are disposed proximate the first end 30A of the storage tank 12A and are in fluid communication through corresponding openings defined by the first end 52A of the external housing 46A. In this embodiment, an outlet pipe 96 is provided for withdrawing heated fluid from the storage tank 12A. The outlet pipe 96 is carried within the storage tank 12A and is connected to the first end 30A of the storage tank 12A such that the outlet pipe 96 is in fluid communication with the hot fluid outlet 60A. In the preferred embodiment, the outlet pipe 96 extends horizontally toward the second end 32A of the storage tank 12A and is approximately three-fourths the length of the storage tank 12A. A substantial 90° downward bend 102 is defined by the outlet pipe 96 proximate the second end 100 such that fluid is drawn from the volume 28A at such a depth as to prevent the drawing of air and cavitation. By preventing the draw of air and cavitation, fluid hammer within the piping system is reduced.

An exchange assembly 24 is provided for drawing high temperature fluid from the storage tank 12, mixing the high temperature fluid with lower temperature exchanged water to obtain at least one selected temperature system water, and dispensing the desired temperature water to the appropriate systems. A hot fluid outlet 60 provides fluid communication between the storage tank 12 and the exchange assembly 24. The hot fluid outlet 60 is connected to the storage tank 12 as described above and is received through the corresponding port defined by the external housing 46. The hot fluid outlet 60 is connected to and in fluid communication with a high temperature fluid line 104 which is in turn connected to and in fluid communication with a control valve 106. The control valve 106 controls the rate of flow from the high temperature fluid line 104 and a low temperature fluid line 108, thus balancing the amount of energy output from the control valve 106. The control valve 106 is connected through a line 110 to a temperature sensor 112, the control valve 106 and temperature sensor 112 being in fluid communication. The control valve 106 is in the closed position, such that fluid communication between the high temperature fluid line 104 and the exchange assembly 24 is prevented, when no power is delivered thereto. The temperature sensor 112 includes a temperature control 114 for maintaining a constant temperature fluid to a heat exchanger 118. The temperature sensor 112 further includes a secondary high limit thermostat 116 for controlling the temperature of the output fluid in the event the control valve 106 fails and delivers fluid at a temperature in excess of 35° F. to 50° F. of the design temperature. When the control valve 106 delivers fluid at a temperature in excess of 35° F. to 50° F. of the design temperature, the secondary high limit thermostat 116 turns the control valve 106 CLOSED such that no high temperature fluid is allowed into the exchange assembly 24. A heat exchanger 118 is provided to reduce the system water temperature to the final design temperature. A thermostatic control valve 120 is carried by the heat exchanger 118 for setting the design temperature as desired. A cold water inlet 122 is carried by the heat exchanger 118 for exchange with the fluid introduced from the storage tank 12, the percentages of heated and cold WATER being controlled by the thermostatic control valve 120. A plurality of heat exchangers 118 may be included in series or in parallel, with the temperature of the heated fluid being introduced to each heat exchanger 118 in parallel, and to each of the first heat exchangers 118 in each series, being that design temperature as delivered through the temperature sensor 112 by the control valve 106. A system outlet 124 is carried by each of the heat exchangers 118 for delivering heated water at the temperatures selected by the thermostatic control valves 120 to the potable water supply and to the space heating system. A plurality of return lines 126 are provided for recirculating fluid from the heat exchangers 118 to be used in selectively cooling high temperature fluid in the control valve 106 and to be reintroduced and reheated in the storage tank 12. A plurality of pumps 128 are connected to and in fluid communication with the return lines 126 and the storage tank 12 and are used to increase the circulation of the fluid within the system 10. Each pump 128 is operative independently of the other. In the preferred embodiment, two pumps 128-130 are included. Pump 128 typically operates constantly, with the second pump 130 operating only when a high demand is placed upon the system 10. A swing check valve 132 is connected along the line fluidly connecting the pumps 128-130 and the storage tank 12 to prevent the convection action of the system 10 from forcing the heated fluid to flow in the reverse direction.

Figure 9:
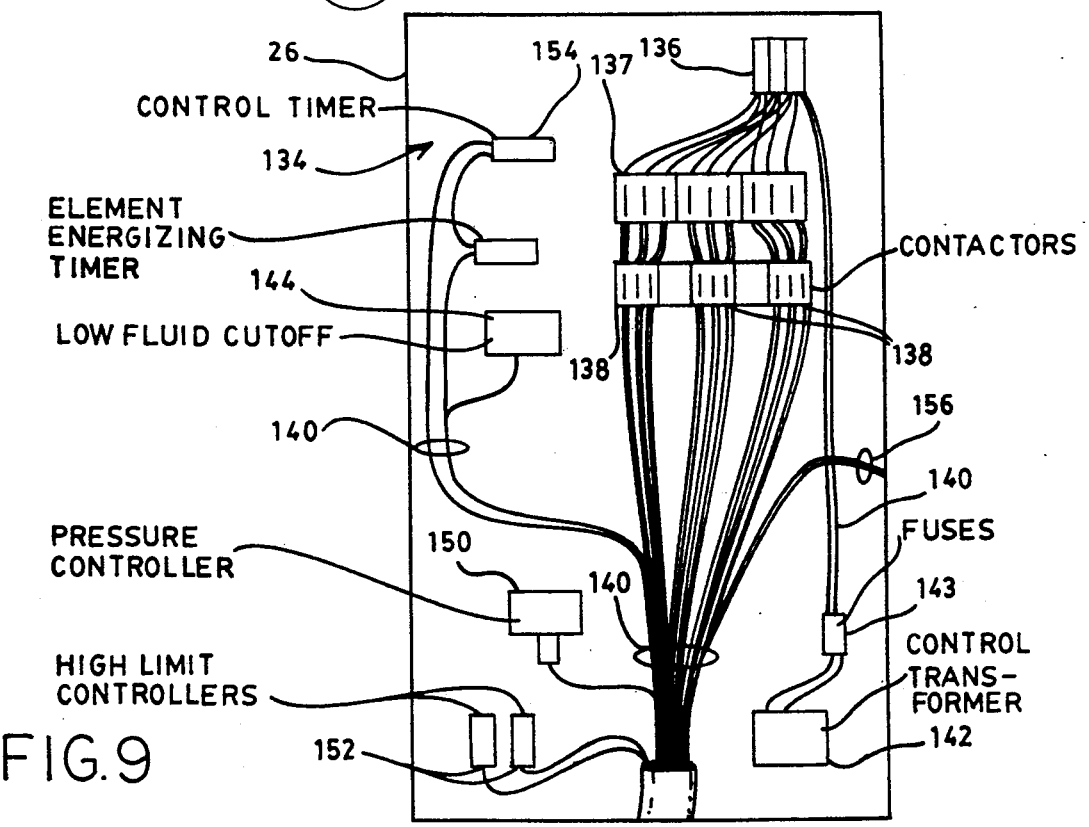
FIG. 9 illustrates the control cabinet of a preferred embodiment of the thermal storage system.

A control cabinet 26 is carried by the external housing 46 for housing the electrical components 134 of the exchange assembly 24. The control cabinet 26 shown in FIG. 9 shows a main power block 136 connected to a fuse block 137. The fuse block 137 is then electrically connected to a plurality of contactors 138 to which are attached a plurality of electrical conduits 140. A control transformer 142 is electrically connected to the main power block 136 with a plurality of fuses 143 being intermediately connected thereto. A low fluid cutoff 144, a pressure controller 150, and two high limit controllers 152 are also shown in the figure and operate as described above. A control timer 154 is connected within the control cabinet 26 for programming the thermal storage system 10 to operate at selected times and temperatures. Further, a plurality of lead wires 156 for electrically activating corresponding indicator lights 158 are included, the indicator lights 158 being included for operator observation.

Figure 10:
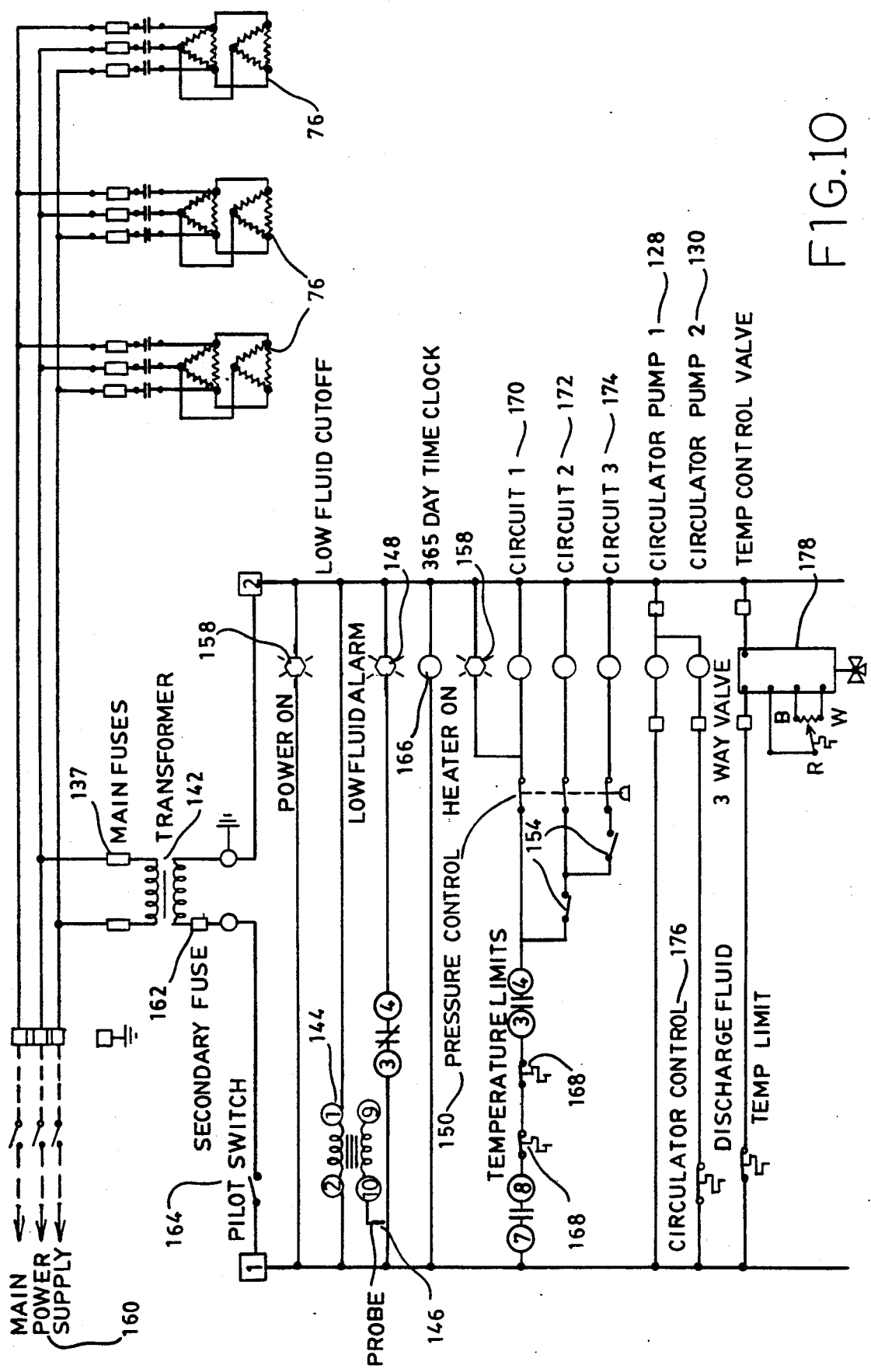
FIG. 10 is a schematic diagram of the circuitry of the thermal storage system of the present invention.
Figure 11:
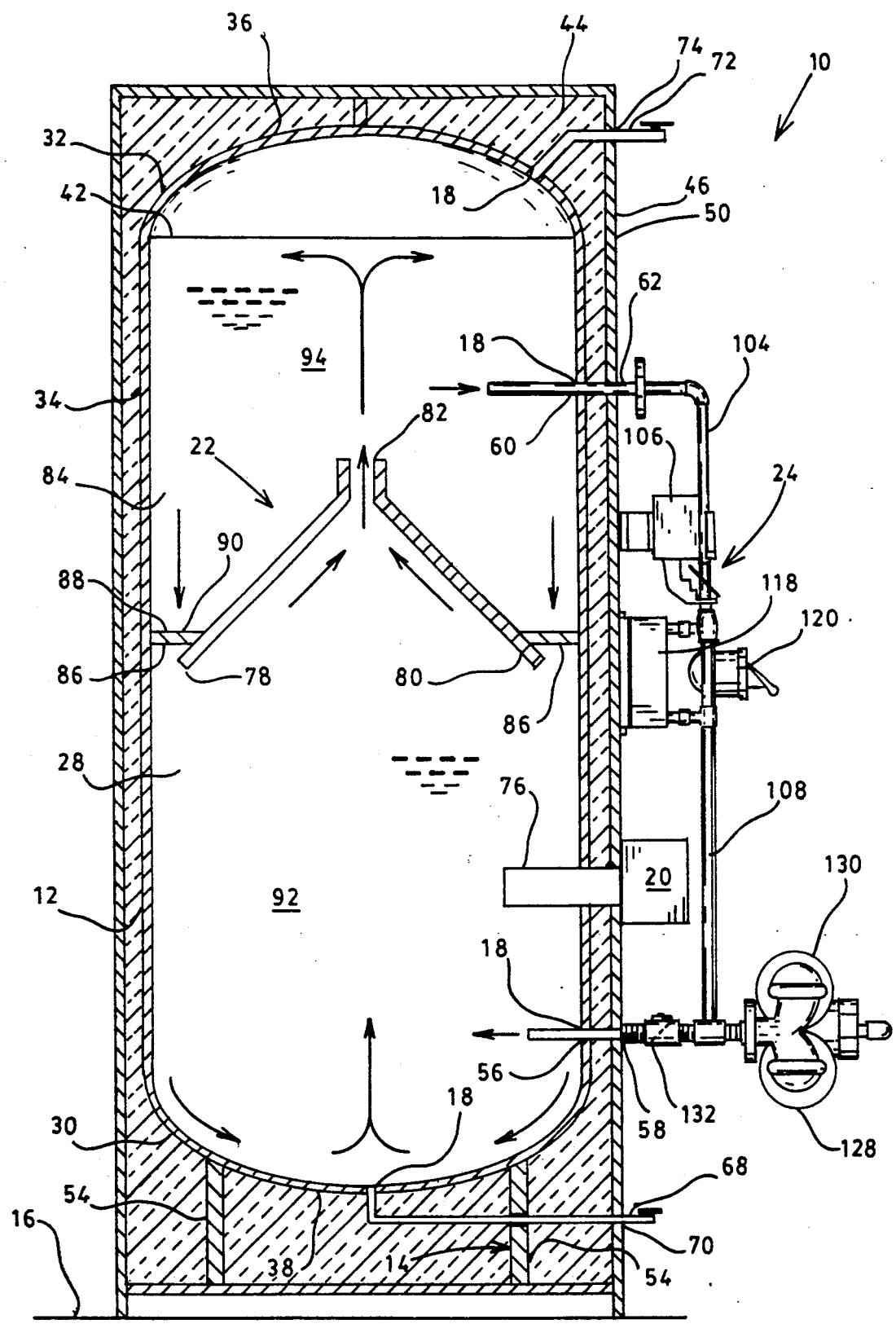
FIG. 11 illustrates a side elevation view, in section, of the thermal storage system shown in FIG. 1 taken at lines 11—11.

An electrical schematic is shown in FIG. 10 as a ladder diagram, the element connected to any particular "rung" being activated only when the particular circuit is completed. The system 10 is powered by the main power supply 136 through the main disconnect 160. In this figure, the power is delivered through a plurality of main fuses 137 to a control transformer 142 and through a plurality of secondary fuses 162. The secondary fuses 162 are provided as protection of the system 10. A pilot switch 164 is provided for turning the system 10 ON and OFF. A light 158 illuminates when the power is ON. A low fluid cutoff 144 is provided for automatically turning the system 10 OFF when a minimum fluid level is reached. A probe 146 is connected to the low fluid cutoff 144 and is disposed within the storage tank 12 such that when the fluid level falls below the level of the probe 146, thus causing the probe 146 to no longer be immersed, the circuit breaks. When the low fluid cutoff circuit is opened due to low fluid, an alarm 148 will be activated to signal low fluid. A time clock 166 is provided for programming the operating times. When the clock 166 is activated, the heater 20 is also activated. A plurality of high temperature limits 168 are included for sensing the temperature within the storage tank 12 such that as a maximum limit, temperature is obtained. The system is safety deactivated. The pressure controls 150 are activated to increase pressure and the circuits 170-172-174 controlling the heating elements 76 are activated. Timer switches 154 are provided for delaying the start time between the first and second circuits 170-172 and the second and third circuits 172-174 respectively. In the preferred embodiment, the delay time is 10 seconds, such that the third circuit 174 will activate 20 seconds after the first circuit 170. The first pump 128 is connected such that it operates continuously when the system 10 is powered. The second pump 130 is activated when the circulator control 176 senses a high demand on the system 10 and completes the second pump 130 circuit in response. A three-way control valve 178 is activated when the entire ladder diagram is complete. The three-way control valve 178 corresponds to the control valve 106 of FIG. 1. Heating elements 76 are controlled by the respective first, second, and third circuits 170-172-174.

From the foregoing description, it will be recognized by those skilled in the art that a thermal storage system offering advantages over the prior art has been provided. Specifically, the thermal storage system provides a means for storing thermal energy acquired from electricity and from other fuel sources such as fossil fuels, waste heat, and solar energy. For thermal energy generated from electricity, the thermal storage system is designed to operate at off-peak demand times such as to create a substantially constant total electricity demand from the structure. For thermal storage derived from fuels other than electricity, the thermal storage system is designed to operate at a constant rate to maximize efficiency, the required storage capacity thus being lower than that required to supply heated fluid during peak demand periods when the fluid is heated as demanded or when off-peak electricity is used to heat the stored fluid. Moreover, the thermal storage system is designed to supply a plurality of system outputs at individually selected temperatures.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,

1. A thermal storage system for storing thermal energy in the form of heated fluid to be used in exchange with a plurality of independent systems including potable water supplies and space heating systems, said thermal storage system comprising:

a storage receptacle for storing a selected volume of a selected heat transfer fluid, said selected volume of said selected heat transfer fluid defining a fluid level;

at least one heating element for heating said selected volume of said selected heat transfer fluid to a selected temperature;

a pressurizer for pressurizing said storage receptacle to a selected pressure to prevent flashing of said selected heat transfer fluid;

an outlet for dispensing said selected heat transfer fluid at said selected temperature to a selected location;

a plurality of heat exchangers, each of said plurality of heat exchangers in fluid communication with said outlet at said selected location for heating a selected fluid to a selected system output temperature, each of said plurality of heat exchangers defining a primary chamber and a secondary chamber, said primary chamber including inlet and outlet ports for fluid communication therethrough of said selected heat transfer fluid and said secondary chamber including inlet and outlet ports for fluid communication therethrough of said selected fluid, each said primary chamber defined by each of said plurality of heat exchangers being connected in parallel with each other, and at least one said secondary chamber defined by one of said plurality of heat exchangers being connected independently from all other said secondary chambers defined by all other said plurality of heat exchangers and in fluid communication with one of said plurality of independent systems;

a recirculation line for recirculating said selected heat transfer fluid evacuated from each of said plurality of heat exchangers through said first outlet port, said selected heat transfer fluid being evacuated at a reduced temperature as compared to said selected temperature;

a thermostatic mixing valve in fluid communication between said storage receptacle, each of said plurality of heat exchangers, and said recirculation line for mixing said selected heat transfer fluid at said selected temperature with said selected heat transfer fluid at said reduced temperature in selected proportions to control a temperature defined by said selected heat transfer fluid delivered to each of said plurality of heat exchangers;

a temperature sensor for monitoring said temperature of said selected heat transfer fluid and producing a signal dependent upon said temperature;

a temperature controller for receiving said signal produced by said temperature sensor and selectively enabling and disabling said thermostatic mixing valve, said temperature controller being operably dependent on said signal received from said temperature sensor; and an inlet in fluid communication between said recirculation line and said storage receptacle for introduction of said selected heat transfer fluid at said reduced temperature into said storage receptacle for reheating.

2. The thermal storage system of claim 1 further comprising a fluid circulator carried within said storage receptacle for maintaining said selected temperature of said selected heat transfer fluid within said storage receptacle at a substantially constant temperature, said fluid circulator defining an inlet positioned at a selected location above said at least one heating element and an outlet positioned at a selected location above said inlet and below said fluid level.

3. The thermal storage system of claim 1 wherein said heating elements are carried within said storage receptacle.

4. The thermal storage system of claim 1 further comprising a pressure controller for limiting said selected pressure within said storage receptacle.

5. The thermal storage system of claim 1 wherein each of said plurality of heat exchangers further includes an output temperature selector for selecting said system output temperature of said selected fluid.

6. A thermal storage system for storing thermal energy in the form of heated fluid to be used in exchange with a plurality of independent systems including potable water supplies and space heating systems, said thermal storage system comprising:

a storage receptacle for storing a selected volume of a selected heat transfer fluid, said selected volume of said selected heat transfer fluid defining a fluid level;

at least one heating element for heating said selected volume of said selected heat transfer fluid to a selected temperature, said heating element being carried within said storage receptacle;

a fluid circulator carried within said storage receptacle for maintaining said selected temperature of said selected heat transfer fluid within said storage receptacle at a substantially constant temperature, said fluid circulator defining an inlet positioned at a selected location above said at least one heating element and an outlet positioned at a selected location above said inlet and below said fluid level;

a pressurizer for pressurizing said storage receptacle to prevent flashing of said selected heat transfer fluid;

an outlet for dispensing said selected heat transfer fluid at said selected temperature to a selected location;

a plurality of heat exchangers, each of said plurality of heat exchangers in fluid communication with said outlet at said selected location for heating a selected fluid to a selected system output temperature, each of said plurality of heat exchangers defining a primary chamber and a secondary chamber, said primary chamber including inlet and outlet ports for fluid communication therethrough of said selected heat transfer fluid and said secondary chamber including inlet and outlet ports for fluid communication therethrough of said selected fluid, each said primary chamber defined by each of said plurality of heat exchangers being connected in parallel with each other, and at least one said secondary chamber defined by one of said plurality of heat exchangers being connected independently from all other said secondary chambers defined by all other said plurality of heat exchangers and in fluid communication with one of said plurality of independent systems;

a recirculation line for recirculating said selected heat transfer fluid evacuated from each of said plurality of heat exchangers through said first outlet port, said selected heat transfer fluid being evacuated at a reduced temperature as compared to said selected temperature;

a thermostatic mixing valve in fluid communication between said storage receptacle, each of said plurality of heat exchangers, and said recirculation line for mixing said selected heat transfer fluid at said selected temperature with said selected heat transfer fluid at said reduced temperature in selected proportions to control a temperature defined by said selected heat transfer fluid delivered to each of said plurality of heat exchangers;

a temperature sensor for monitoring said temperature of said selected heat transfer fluid and producing a signal dependent upon said temperature;

a temperature controller for receiving said signal produced by said temperature sensor and selectively enabling and disabling said thermostatic mixing valve, said temperature controller being operably dependent on said signal received from said temperature sensor;

an inlet in fluid communication between said recirculation line and said storage receptacle for introduction of said selected heat transfer fluid at said reduced temperature into said storage receptacle for reheating;

an output temperature selector for selecting said system output temperature of said selected fluid; and a pressure controller for limiting the pressure within said storage receptacle.

7. The thermal storage system of claim 6 wherein said storage receptacle includes a tank disposed in a substantially vertical position.

8. The thermal storage system of claim 7 wherein said fluid circulator includes a substantially inverted funnel-shaped member connected to said storage receptacle above said heating element.

9. The thermal storage system of claim 6 wherein said storage receptacle includes a tank disposed in a substantially horizontal position.

10. The thermal storage system of claim 9 wherein said outlet is configured to draw said selected heat transfer fluid from said storage receptacle at a position substantially opposite said inlet.

* * * * *